United States Patent
Kashiwagi

(10) Patent No.: US 7,108,407 B2
(45) Date of Patent: Sep. 19, 2006

(54) REAR FENDER INTEGRATED TAIL LAMP DEVICE FOR MOTORCYCLE

(75) Inventor: Akira Kashiwagi, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 10/624,923

(22) Filed: Jul. 22, 2003

(65) Prior Publication Data

US 2004/0130901 A1  Jul. 8, 2004

(30) Foreign Application Priority Data

Sep. 4, 2002  (JP) .............................. 2002/258384

(51) Int. Cl.
*B62J 6/04* (2006.01)

(52) U.S. Cl. ..................... 362/473; 362/506; 362/545; 362/549

(58) Field of Classification Search ................ 362/473, 362/506, 541, 459, 487, 496, 497, 540, 543, 362/544, 227, 235, 236, 244, 245, 249, 252, 362/362, 368, 369, 800, 545, 549; 293/28, 293/29
See application file for complete search history.

(56) References Cited

U.S. PATENT DOCUMENTS

| | | | | |
|---|---|---|---|---|
| 2,343,754 A | * | 3/1944 | Donley ....................... | 362/540 |
| 2,433,469 A | * | 12/1947 | Malmquist .................. | 362/541 |
| 3,222,512 A | * | 12/1965 | Dickson ...................... | 362/540 |
| 3,941,994 A | * | 3/1976 | Petty et al. .................. | 362/473 |
| 4,680,678 A | * | 7/1987 | Iwaki .......................... | 362/545 |
| 4,733,335 A | * | 3/1988 | Serizawa et al. ............ | 362/545 |
| 4,858,081 A | * | 8/1989 | James ........................ | 362/541 |
| 5,101,326 A | * | 3/1992 | Roney ........................ | 362/545 |
| 5,241,457 A | * | 8/1993 | Sasajima et al. ............ | 362/503 |
| 5,384,693 A | * | 1/1995 | Schwaller et al. ........... | 362/473 |
| 5,388,035 A | * | 2/1995 | Bodem, Jr. .................. | 362/545 |
| 5,438,487 A | * | 8/1995 | Schmid et al. .............. | 362/545 |
| 5,526,240 A | * | 6/1996 | Kuo ............................ | 362/473 |
| 5,528,474 A | * | 6/1996 | Roney et al. ................ | 362/545 |
| 5,713,653 A | * | 2/1998 | White et al. ................ | 362/473 |
| 6,053,626 A | * | 4/2000 | Zagrodnik et al. .......... | 362/473 |
| 6,276,822 B1 | * | 8/2001 | Bedrosian et al. ........... | 362/545 |
| 6,585,072 B1 | * | 7/2003 | Scherbarth .................. | 180/219 |
| 6,793,384 B1 | * | 9/2004 | Ban et al. .................... | 362/473 |

FOREIGN PATENT DOCUMENTS

JP  11-263257  9/1999

* cited by examiner

*Primary Examiner*—Alan Cariaso
*Assistant Examiner*—Ismael Negron
(74) *Attorney, Agent, or Firm*—Hogan & Hartson LLP

(57) ABSTRACT

A tail lamp device includes a tail lamp that is attached to the rear fender of a motorcycle. The tail lamp includes a substrate and a plurality of light emitting elements such as LEDs mounted on the substrate, and the substrate is disposed along a rearwardly descending surface of the rear fender to reduce protrusion of the tail lamp from the rear fender. A lens covering the light emitting elements has a directivity that directs light emitted from the light emitting elements generally horizontally to the rear of the motorcycle.

2 Claims, 8 Drawing Sheets

REAR FENDER INTEGRATED TAIL LAMP DEVICE FOR MOTORCYCLE

BACKGROUND OF THE INVENTION

1. Field of the Invention

The present invention relates to tail lamp devices for vehicles such as motorcycles.

2. Related Background Art

A motorcycle may be equipped with a tail lamp mounted on a rear fender that covers a rear wheel of the motorcycle.

The tail lamp generally has a structure that covers light bulbs with a lens. The light bulbs may burn out, and the tail lamp substantially protrude rearward, which provides a poor appearance.

In view of the above problem, a lamp device composed of a plurality of light emitting elements mounted on a driving substrate may be used instead of light bulbs. The light emitting elements do not burn out, and the lamp device can be made thinner as light bulbs are not used. However, the lamp device may substantially protrude rearwardly from the rear fender, such that the lamp device and the rear fender do not appear to be integrated in one piece, in other words, they do not provide a sense of integration.

SUMMARY OF THE INVENTION

The present invention relates to a tail lamp device for a motorcycle in which a tail lamp device is better integrated in a rear fender of the motorcycle.

Also, the present invention relates to a tail lamp device for a motorcycle having a structure that can better integrate a tail lamp device with a rear fender of the motorcycle.

In accordance with an embodiment of the present invention, a tail lamp device for a motorcycle includes a tail lamp attached to a rear fender of the motorcycle that covers a rear wheel, wherein the tail lamp is formed from a substrate and a plurality of light emitting elements mounted on the substrate, and the substrate is disposed along a rearwardly descending surface of the rear fender.

Due to the fact that the substrate with the plurality of light emitting elements mounted thereon is disposed along the rearwardly descending surface of the rear fender, a protrusion of the tail lamp device from the rear fender can be suppressed or reduced, which provides a sense of greater integration of the tail lamp device with the fender, and the good appearance.

In one aspect of the present embodiment, the tail lamp may include a lens that covers the plurality of light emitting elements and has a directivity that orients light emitted from the light emitting elements toward a rear of the motorcycle.

Due to the fact that the tail lamp includes the lens that covers the plurality of light emitting elements and has a directivity that orients light emitted from the light emitting elements toward a rear of the motorcycle, the tail lamp device can be mounted on the rear fender with a protrusion of the tail lamp from the rear fender being substantially limited.

In another aspect of the present embodiment, the rear fender may be provided with a mounting concave section, and circuit elements that are mounted on the substrate are positioned in the mounting concave section.

Due to the fact that the circuit elements on the substrate are positioned in the mounting concave section formed in the rear fender, a protrusion of the tail lamp device from the rear fender can be restrained when the tail lamp device is mounted on the rear fender.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

Figure 1:
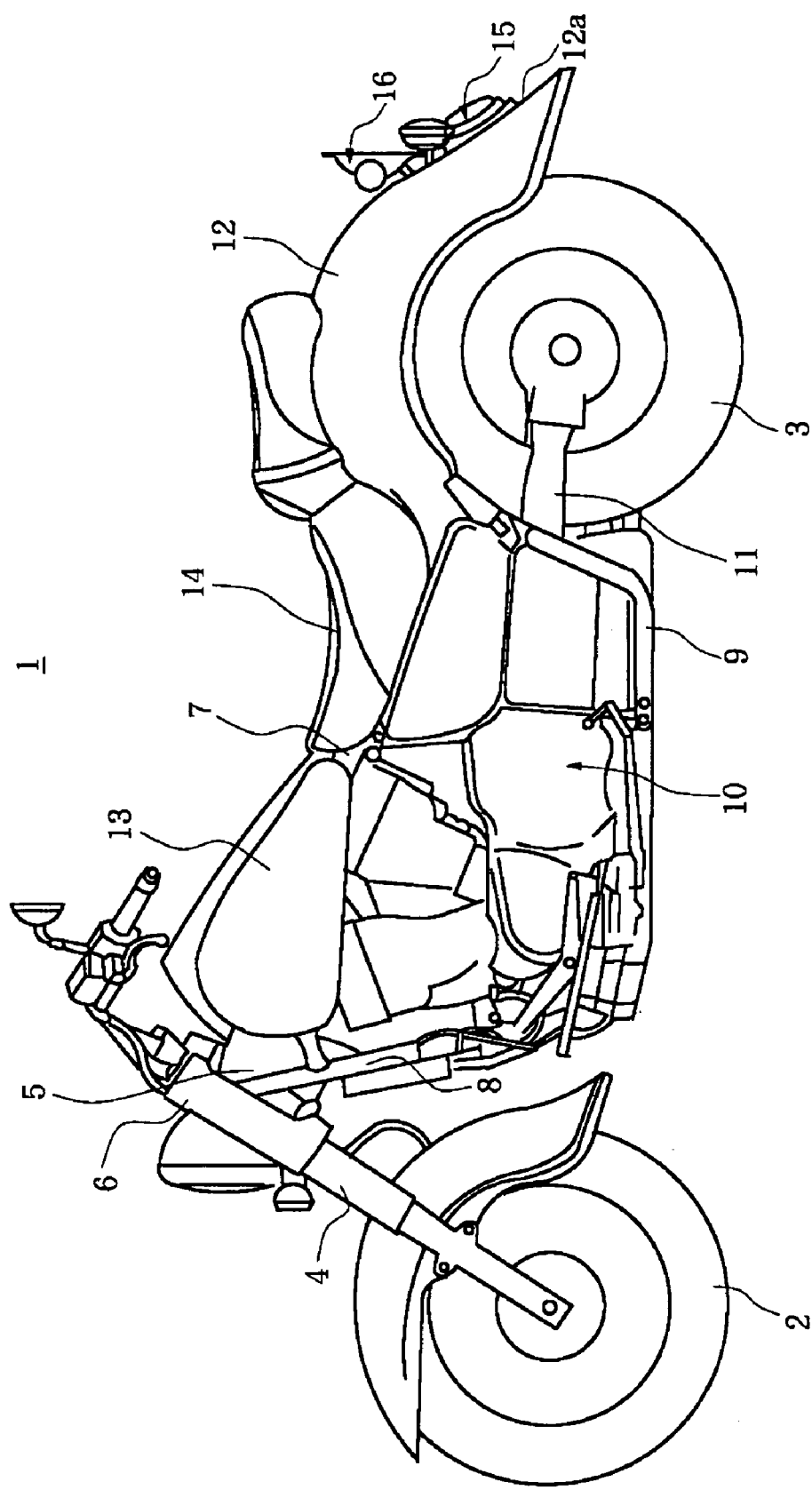
FIG. 1 is a side view of a motorcycle.
Figure 2:
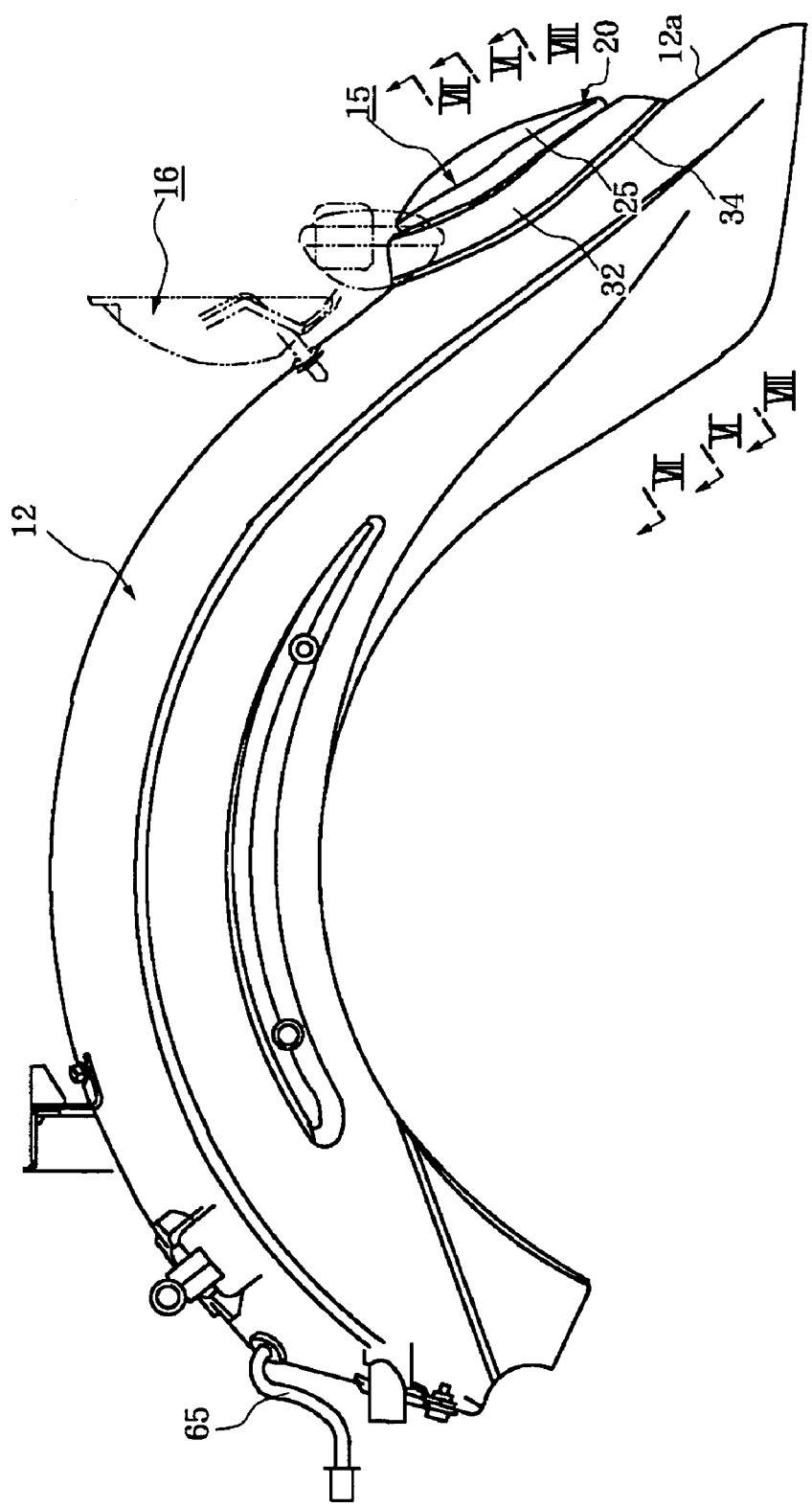
FIG. 2 is a side view of a rear fender with a tail lamp mounted thereon.
Figure 3:
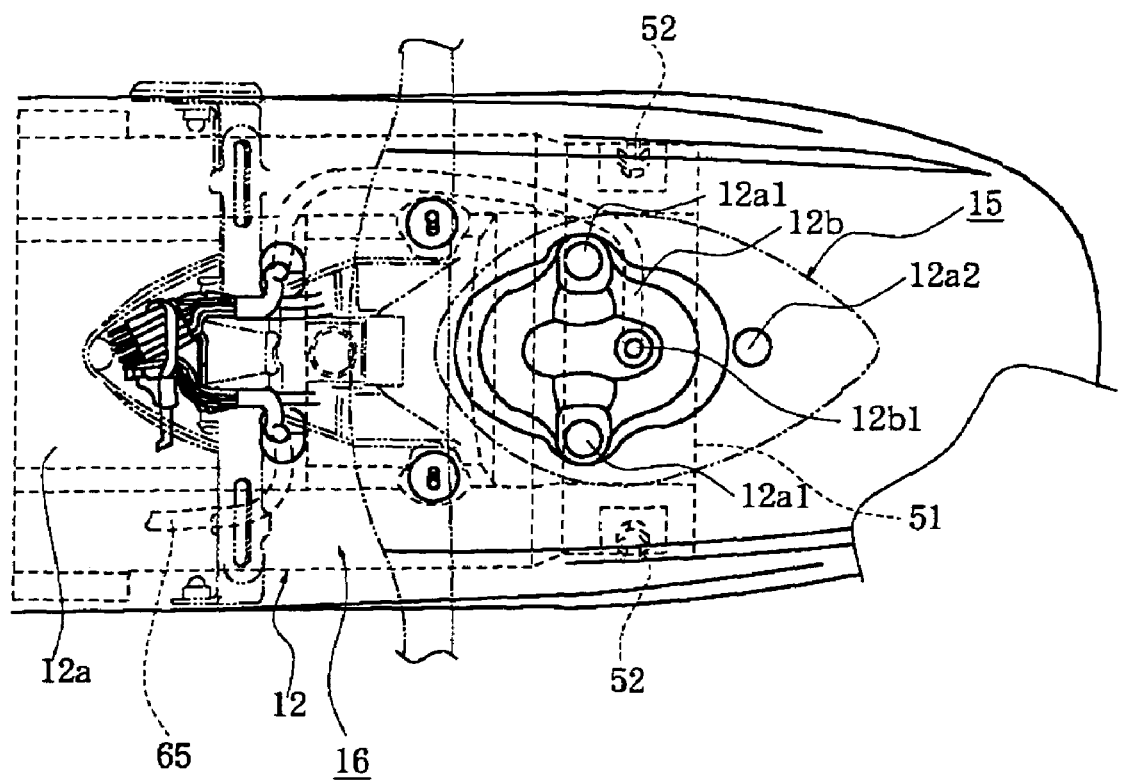
FIG. 3 is a plan view of the rear fender without a tail lamp.
Figure 4:
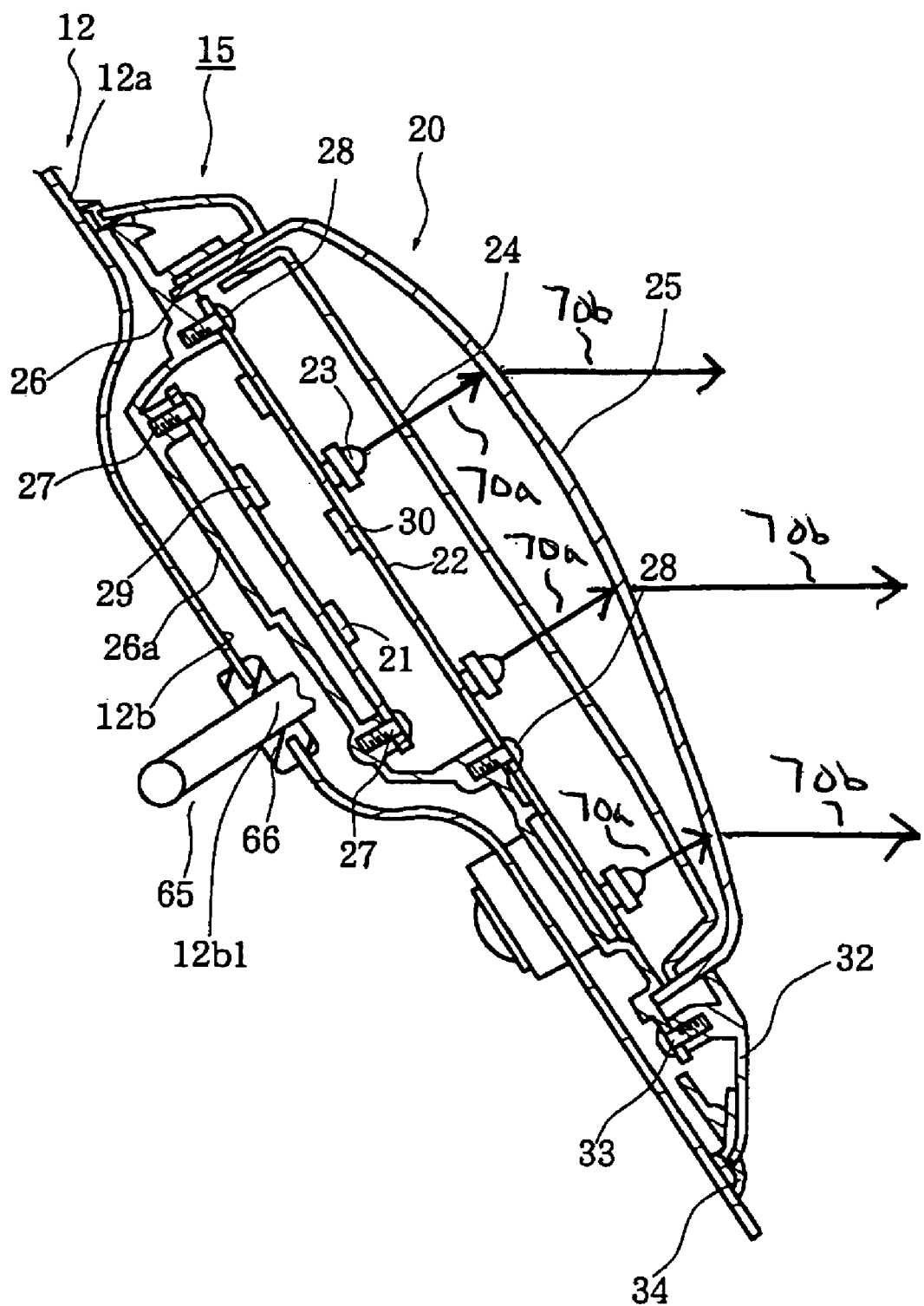
FIG. 4 is a cross-sectional view of the tail lamp.
Figure 5:
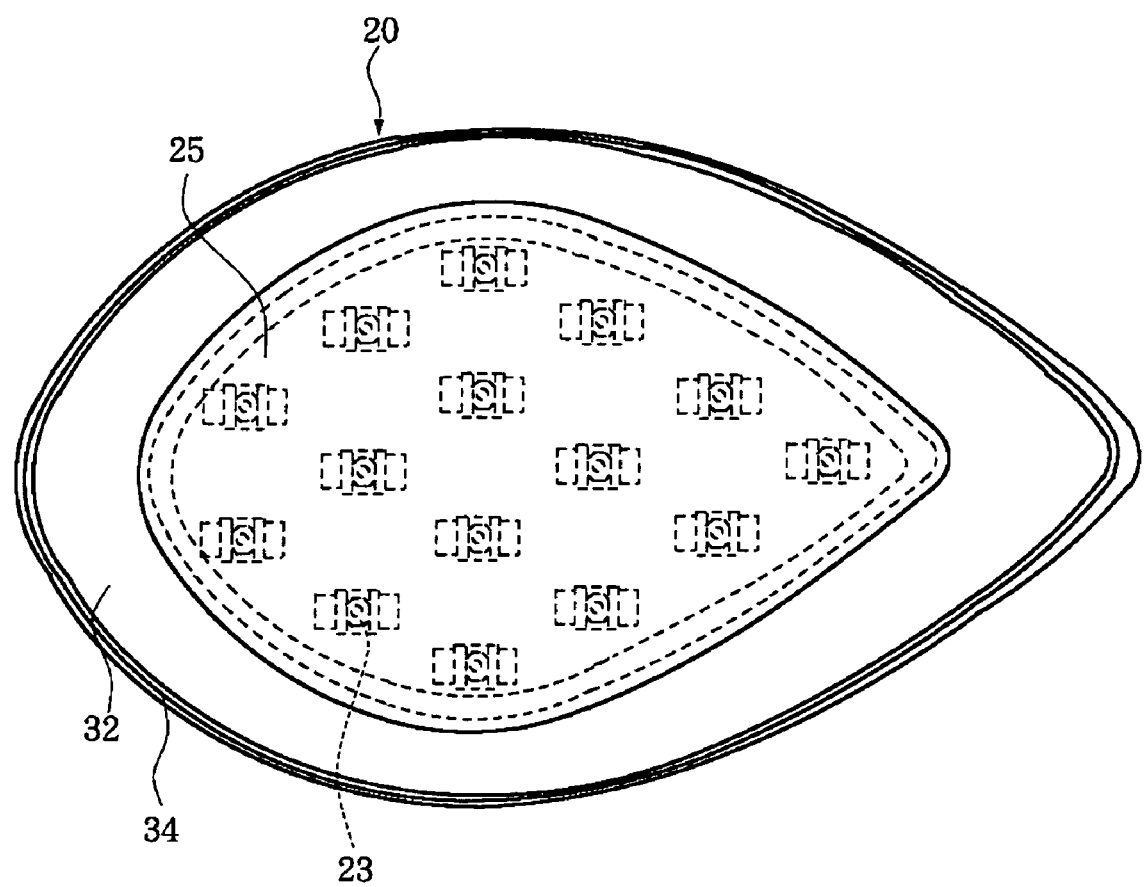
FIG. 5 is a plan view of the tail lamp.
Figure 6:
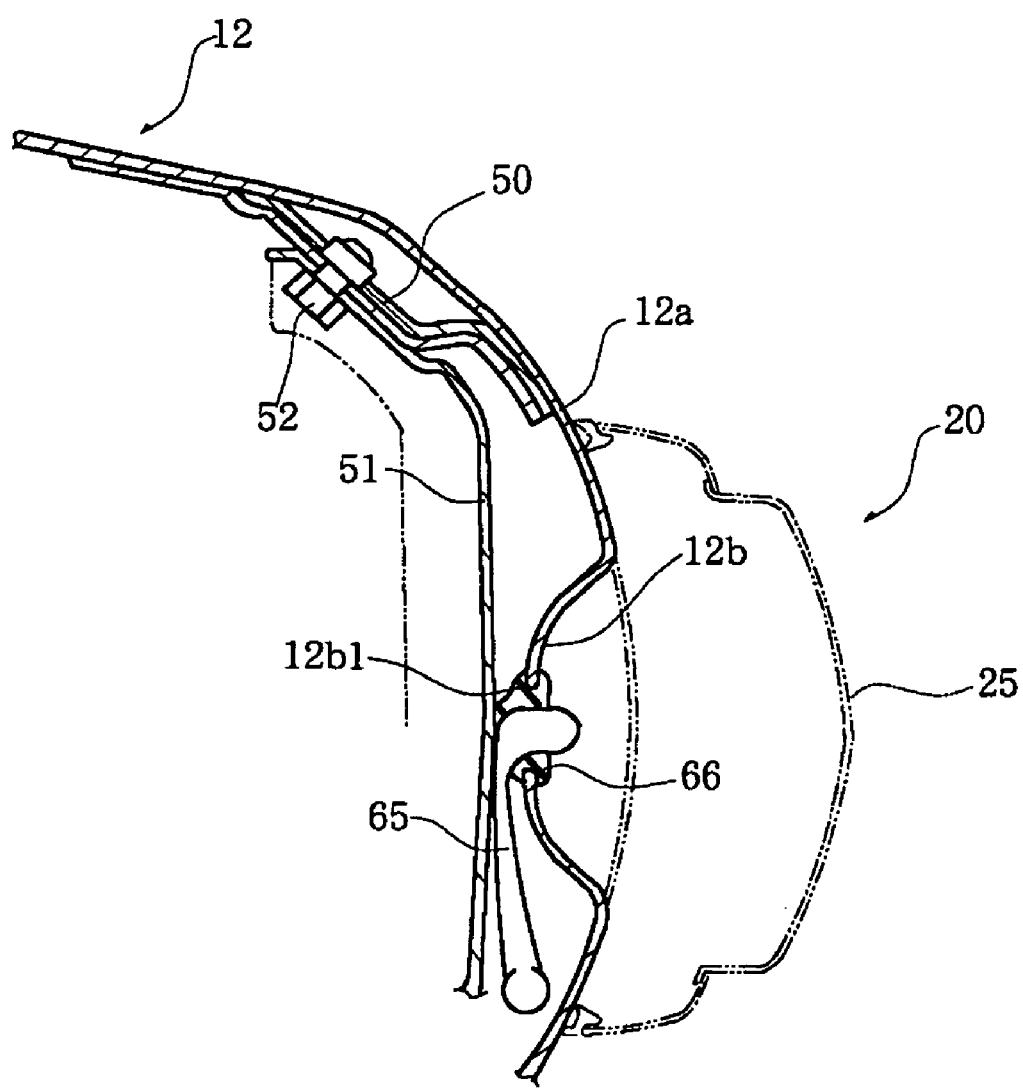
FIG. 6 is a cross-sectional view taken along lines VI—VI of FIG. 2.
Figure 7:
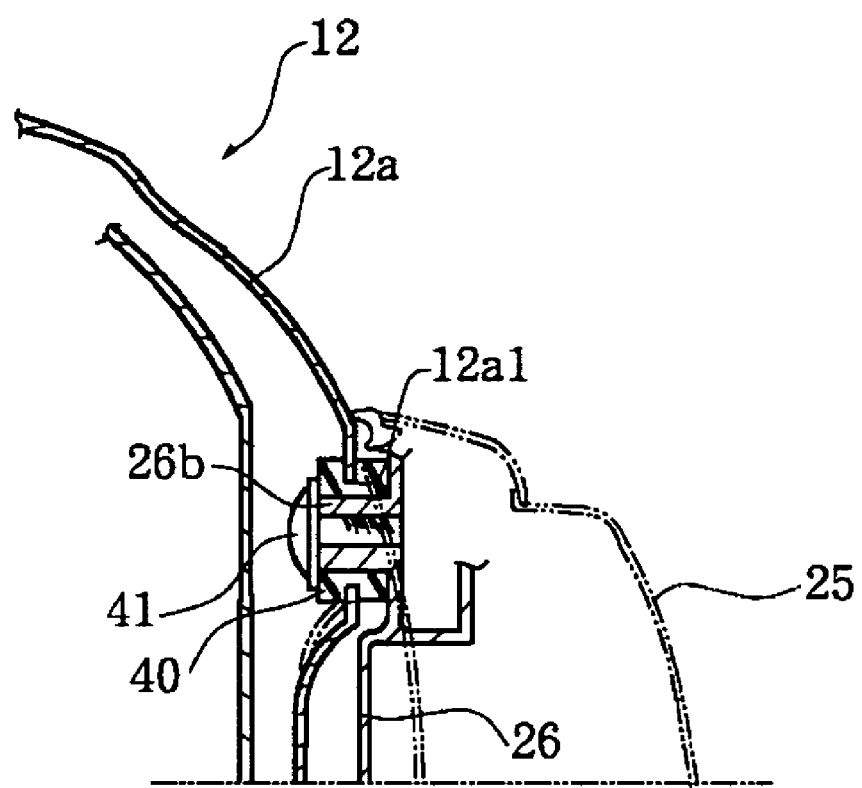
FIG. 7 is a cross-sectional view taken along lines VII—VII of FIG. 2.
Figure 8:
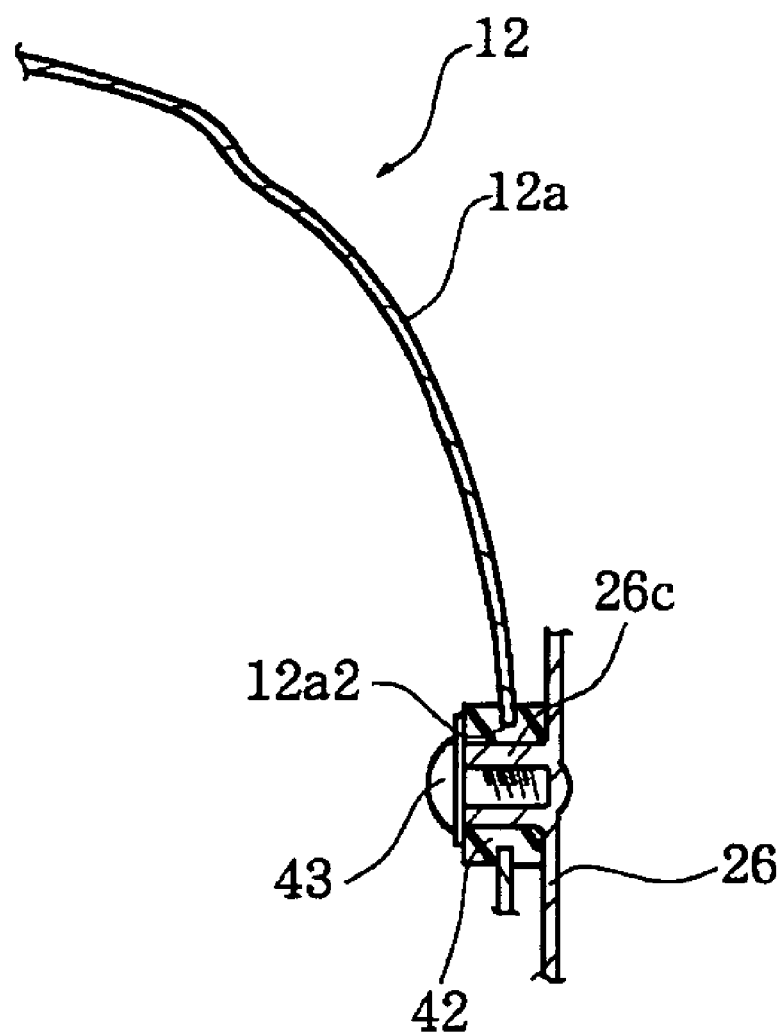
FIG. 8 is a cross-sectional view taken along lines VIII—VIII of FIG. 2.

A tail lamp device for a motorcycle in accordance with an embodiment of the present invention will be described below with reference to the accompanying drawings. FIG. 1 is a side view of a motorcycle. FIG. 2 is a side view of a rear fender with a tail lamp mounted thereon. FIG. 3 is a plan view of the rear fender without a tail lamp. FIG. 4 is a cross-sectional view of the tail lamp. FIG. 5 is a plan view of the tail lamp. FIG. 6 is a cross-sectional view taken along lines VI—VI of FIG. 2. FIG. 7 is a cross-sectional view taken along lines VII—VII of FIG. 2. FIG. 8 is a cross-sectional view taken along lines VIII—VIII of FIG. 2.

A motorcycle 1 of the present embodiment may be an American type, which has a longer wheel base between a front wheel 2 and a rear wheel 3 compared to a road racer type. In the motorcycle 1, a front fork 4 that rotatably supports the front wheel 2 is supported in a manner swingable by a steering head 6 of a vehicle frame 5.

The vehicle frame 5 is generally composed of the steering head 6, a tank rail 7, a down tube 8 and a rear arm bracket 9; and an engine 10 is mounted on the vehicle frame 5.

The rear arm bracket 9 shaft-supports a rear arm 11, and the rear arm 11 shaft-supports the rear wheel 3. A rear fender 12 that covers over the upper portion of the rear wheel 3 is mounted on the rear arm bracket 9. Also, a fuel tank 13 is mounted on the tank rail 7 above the engine 10, and a two-step sheet 14 is provided in the rear of the fuel tank 13, extending from a front section to a rear upper section of the rear arm 11.

The rear fender 12 generally overlaps, as viewed from the side in a side view in FIG. 1, a circumferential section in an upper half section of the rear wheel 3, and its overall configuration is generally arcuate. The rear fender 12 includes a rearwardly descending face 12a that faces upward, and has a sloped, rearwardly descending and generally planar surface. A tail lame device 15 is mounted on the rearwardly descending face 12a, and a rear flasher lighting device 16 is mounted above the tail lamp device 15.

A tail lamp 20 composes at least a part of the tail lamp device 15, and includes substrates 21 and 22, a plurality of light emitting elements 23, an inner lens 24 and an outer lens 25. The substrate 21 is screw-fastened to a concave section 26a of a housing 26 with screws 27, and the substrate 22 is screw-fastened to the housing with screws 28 and covers the concave section 26a. The concave section 26a of the housing 26 protrudes from a bottom surface of the housing 26 as viewed from outside. Circuit elements 29 and 30 are mounted on opposing surfaces of the substrate 21 and the substrate 22. The plurality of light emitting elements 23 are mounted on an outer side surface of the substrate 22. For example, the light emitting elements 23 may be composed of LED light emitting elements, which would not burn out like light bulbs.

A cover 32 is screw-fastened to the housing 26 with screws 33, and the inner lens 24 and the outer lens 25 are supported by the cover 32. The inner lens 24 and the outer lens 25 cover the plurality of light emitting elements 23, and at least one of the inner lens 24 and the outer lens 25 has a directivity that rearwardly orients light emitted from the light emitting elements 23. A seal member 34 engages with an outer circumference of the cover 32.

As shown in FIGS. 3 and 4, a mounting concave section 12b is formed in the rear fender 12 that covers the rear wheel 3, the concave section 26a of the housing is positioned and placed inside in the mounting concave section 12b, and the housing 26 is screw-fastened to the rear fender 12 with an predetermined number of screws, for example, three screws.

As shown in FIG. 6, a support bracket 50 is mounted on the inside of the rear fender 12, and the support bracket 50 is screw-fastened with bolts 52 to a fender stay 51 that is affixed to the vehicle frame 5, such that the rear fender 12 is supported by the fender stay 51.

As shown in FIG. 7, the tail lamp 20 is fastened at two places in its front side area to the rear fender 12. At each of the two places, a grommet 40 is mounted on a mounting boss 26b of the housing 26, the grommet 40 is fitted to a mounting hole section 12a1 that is formed in the rearwardly descending surface 12a of the rear fender 12, and a screw 41 is screwed in the mounting boss 26b. By so doing, the front side area of the tail lamp 20 is prevented from pulling off from the rear fender 12.

Also, the tail lamp 20 is fastened at one place in its rear side area to the rear fender 12. As shown in FIG. 8, a grommet 42 is provided on a mounting boss 26c of the housing 26, the grommet 42 is fitted in a mounting hole section 12a2 that is formed in the rearwardly descending surface 12a of the rear fender 12, and a screw 43 is screwed in the mounting boss 26c. By so doing, the rear side area of the tail lamp 20 is prevented from pulling off from the rear fender 12.

The substrates 21 and 22 of the tail lamp 20 are disposed along the rearwardly descending surface 12a of the rear fender 12. A wire harness 65 of power supply lines and signal lines that are to be connected to the substrates 21 and 22 passes a grommet 66 that is fitted in a mounting hole 12b1. The wire harness 65 passes the space between the rear fender 12 and a fender stay 51, and connected to a power supply device side and a control device side at the front side of the rear fender 12.

By disposing the substrate 22 with the plurality of light emitting elements 23 mounted thereon along the rearwardly descending surface 12a of the rear fender 12, a protrusion of the tail lamp 20 from the rear fender is substantially reduced, and the tail lamp 20 appears to be more integrated with the rear fender 12, which assures to provide the good appearance.

Also, the plurality of light emitting elements 23 are mounted on the substrate 22 in a manner that the light emitting elements 23 extend generally perpendicular to the substrate 22. In other words, the light emitting elements 23 may be directed relatively diagonally. However, the inner lens 24 and the outer lens 25 that cover the light emitting elements 23 has a directivity that directs light emitted from the light emitting elements 23 (arrows 70a in FIG. 4) to the rear (arrows 70b in FIG. 4). Preferably, the inner lens 24 and the outer lens 25 may direct the light emitted from the light emitting elements 23 (arrows 70a in FIG. 4) generally horizontally (arrows 70b in FIG. 4) to the rear of the motorcycle. As a result, the tail lamp 20 can be made thinner.

Furthermore, since the circuit elements 29 and 30 on the substrates 21 and 22 can be disposed in the mounting concave section 12b of the rear fender 12, it is easy to secure the space for disposing the circuit elements 29 and 30, which would further prevent the tail lamp 20 from protruding from the rear fender 12.

As described above, since the substrate with the plurality of light emitting elements mounted thereon is disposed along the rearwardly descending surface of the rear fender, a protrusion of the tail lamp device from the rear fender can be suppressed or reduced, which provides a sense of greater integration of the tail lamp device with the fender, and the good appearance.

Also, the tail lamp includes the lens that covers the plurality of light emitting elements and has a directivity that directs light emitted from the light emitting elements toward the rear of the motorcycle, the tail lamp device can be mounted on the rear fender with a protrusion of the tail lamp from the rear fender being substantially limited.

Furthermore, the rear fender is provided with a mounting concave section, and the circuit elements on the driver substrates are positioned in the mounting concave section. As a result, a protrusion of the tail lamp device from the rear fender can be further restrained when the tail lamp device is mounted on the rear fender.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A rear fender having a tail lamp device that is mounted on a motorcycle, the tail lamp device comprising:
    a concave mounting section formed in a rearwardly sloped surface of the rear fender;
    a lamp substrate that substantially covers the concave mounting section and is disposed along a rearwardly sloped surface of the rear fender;
    a plurality of light emitting elements mounted on the lamp substrate, wherein each of the plurality of light emitting elements extends in a same direction which is diagonally relative to a horizontal direction;
    at least one lens that covers the plurality of light emitting elements and has a directivity that causes light emitted rearwardly from the plurality of light emitting elements in a direction diagonally relative to the horizontal direction to be redirected in the horizontal direction; and
    a circuit substrate for at least the light emitting elements, disposed in the concave mounting section below the lamp substrate.

2. A rear fender according to claim 1, wherein the light emitting elements are LED elements.

* * * * *